(12) United States Patent
Naiki

(10) Patent No.: US 7,039,426 B2
(45) Date of Patent: May 2, 2006

(54) PORTABLE INFORMATION APPARATUS HAVING COMMUNICATIONS TOOLS, A CONTROL SYSTEM FOR CONTROLLING SUCH PORTABLE INFORMATION APPARATUS, AND AN APPARATUS HAVING SUCH CONTROL SYSTEM

(75) Inventor: Takashi Naiki, Kyoto (JP)

(73) Assignee: Rohm Co., LTD, Kyoto (JP)

( * ) Notice: Subject to any disclaimer, the term of this patent is extended or adjusted under 35 U.S.C. 154(b) by 523 days.

(21) Appl. No.: 09/900,701

(22) Filed: Jul. 5, 2001

(65) Prior Publication Data

US 2002/0065070 A1    May 30, 2002

(30) Foreign Application Priority Data

Jul. 10, 2000   (JP)   ............................. 2000-208159
Jun. 21, 2001   (JP)   ............................. 2001-188269

(51) Int. Cl.
*H04Q 7/20*   (2006.01)

(52) U.S. Cl. ............................. 455/456.4; 455/456.5; 455/456.6; 455/1

(58) Field of Classification Search ............. 455/1, 455/456.4, 456.5, 456.6
See application file for complete search history.

(56) References Cited

U.S. PATENT DOCUMENTS

| | | | |
|---|---|---|---|
| 6,122,486 A | * | 9/2000 | Tanaka et al. ................ 455/68 |
| 6,496,703 B1 | * | 12/2002 | da Silva ................... 455/456.4 |
| 2001/0031631 A1 | * | 10/2001 | Pitts ........................... 455/411 |

* cited by examiner

*Primary Examiner*—Nay Maung
*Assistant Examiner*—Angelica M. Perez
(74) *Attorney, Agent, or Firm*—Hogan & Hartson, LLP

(57) ABSTRACT

A portable information apparatus 20 having communications tools is provided with a switch 22a for instructing enablement/disenablement of transmission functions of the wireless transmission/reception section 21 of the portable information apparatus 20. The portable information apparatus 20, upon receipt of a transmission prohibition signal from an prohibition signal transmitter 31 installed in a public facility 30, determines whether the transmission functions must be disenabled and automatically controls enablement/disenablement of the transmission functions. The portable information apparatus is thus automatically turned off even when the carrier of the apparatus has forgotten to turn off the transmission functions, thereby allowing the carrier to perform necessary operations not involving transmission of electromagnetic waves without causing a nuisance to others.

7 Claims, 4 Drawing Sheets

PORTABLE INFORMATION APPARATUS HAVING COMMUNICATIONS TOOLS, A CONTROL SYSTEM FOR CONTROLLING SUCH PORTABLE INFORMATION APPARATUS, AND AN APPARATUS HAVING SUCH CONTROL SYSTEM

FIELD OF THE INVENTION

The invention relates to a portable information apparatus having communications tools, e.g. a cellular phone and a personal handyphone system (PHS), and to a control system for controlling such portable information apparatus, and further to an apparatus equipped with a controller for controlling such portable information apparatus.

BACKGROUND OF THE INVENTION

Portable telephone systems such as cellular phones have extensively diffused among people because of the convenience of such system that the carrier of the system can be paged wherever he is, and he can call up his partner from anywhere. Particularly, because of recent improvements of cellular phones and infrastructures of cellular phone systems, cellular phones have functionally evolved beyond mere telephonic devices and have become versatile portable information apparatuses having information processing functions to deal with e-mail and retrieve information.

These portable information apparatuses e.g. cellular phones are configured to transmit electromagnetic waves not only for communication with a relay station (hereinafter referred to as base station) to talk with partners but also for period registration of their current locations at the base station so that the apparatuses can receive telephone calls and e-mail.

As a result of dissemination of such portable information apparatuses, strong electromagnetic waves are emitted everywhere for communications, thereby posing serious problems to devices such as cardiac pace-makers that can fail under strong ambient electromagnetic waves.

A countermeasure for such situations is to have the portable information apparatuses turned off, as in actuality requested to do so in public facilities. However, the portable information apparatuses e.g. cellular phones have versatile information processing functions to deal with e-mail and to retrieve information. They are suited to read information received and/or prepare e-mail while waiting for receipt of a message. Consequently, it is difficult to resort to the sense of morality of the carriers to turn off the portable information apparatuses.

SUMMARY OF THE INVENTION

It is therefore an object of the invention to provide:

a portable information apparatus such as cellular phones having communications tools capable of stopping transmission functions thereof while maintaining information processing functions thereof;

a control system for controlling the portable information apparatus, and an apparatus equipped with a controller for controlling the portable information apparatus.

There is provided, in accordance with one aspect of the present invention, a portable information apparatus having communications tools, said portable information apparatus including:

a wireless transmission/reception section for transmitting to and receiving from an external wireless transmitter/receiver electromagnetic signals;

an operation section for performing various operations;

a display section for displaying status of the operations made by said operation section, and status and the results of transmission/reception operations made by said wireless transmission/reception section; and a control section connected with said wireless transmission/reception section, operation section, and display section, for controlling overall actions of said portable information apparatus, wherein said operation section has selection means for selectively enabling/disenabling said transmission functions of the wireless transmission/reception section.

By providing the selection means in the form of a switch for example for selectively enabling/disenabling the transmission functions of the wireless transmission/reception section in addition to a power supply switch for the entire apparatus, it is possible for the carrier of the apparatus to turn off only the transmission functions. Thus, it is possible for the carrier to perform certain operations, e.g., viewing received information and preparing for e-mail in public facilities, for example, where transmission of electromagnetic waves is prohibited, thereby carrying out desired operations without causing a nuisance to the public.

There is provided, in accordance with another aspect of the present invention, a portable information apparatus having communications tools, said portable information apparatus including:

a wireless transmission/reception section for transmitting to and receiving from an external wireless transmitter/receiver electromagnetic signals;

an operation section for performing various operations;

a display section for displaying status of the operations made by said operation section, and the status and results of transmission/reception operations made by said wireless transmission/reception section; and a control section connected with said wireless transmission/reception section, operation section, and display section, for controlling overall actions of said portable information apparatus, said portable information apparatus further comprising reception means, within or outside said wireless transmission/reception section, for receiving a communication prohibition signal and/or a communication permission signal transmitted from an external facility, and for enabling/disenabling said transmission functions of said wireless transmission/reception section upon receipt of the communication prohibition signal and/or the communication permission signal.

In this portable information apparatus having communications tools, the transmission functions of the wireless transmission/reception section may be automatically enabled/disenabled depending on which of the communication prohibition signal and/or the communication permission signal are/is received from the external facility. Accordingly, the transmission functions of the portable information apparatus may be automatically turned off if the carrier of the portable information apparatus has forgotten to do so. Thus, operations that do not require transmission of electromagnetic waves can be performed without causing a nuisance to others in a public facility.

The portable information apparatus having such communications tools may be adapted to serve as a dedicated receiver when the transmission functions are disenabled.

Thus, the portable information apparatus having such communication functions can be used to receive urgent information even when the transmission functions of the wireless transmission/reception section are disenabled.

The communication prohibition signal and/or the communication permission signal are/is weaker in intensity than the electromagnetic waves transmitted from the wireless transmission/reception section of the portable information apparatus.

Since the communication prohibition signal and/or the communication permission signal are/is weaker than the electromagnetic wave transmitted from the wireless transmission/reception section of the portable information apparatus, the communication prohibition signal and/or the communication permission signal little affect(s) the apparatuses that can easily go wrong under strong ambient electromagnetic waves.

The portable information apparatus having commuinications tools may comprise:

a data section for storing data regarding the portable information apparatus;

a discrimination section, adapted to receive the results of the reception from the reception means and receive data from the data section, for setting the transmission function of the wireless transmission/reception section enabled or disenabled, based on the results received from the reception means and the data received from the data section.

The portable information apparatus having the communications tools may effect appropriate control of the communications tools by determining whether the transmission functions of the wireless transmission/reception section must be enabled/disenabled based on the limitations contained in the communication prohibition signal and/or the communication permission signal received from the external facility and the data regarding the portable information apparatus.

There is provided, in accordance with a further aspect of the present invention, a control system for controlling portable information apparatuses having communications tools, the control system having a transmitter for transmitting a communication prohibition signal and/or a communication permission signal to the portable information apparatuses, said transmitter installed at a location where transmissions of electromagnetic waves from the portable information apparatuses are prohibited.

The transmission functions of portable information apparatuses, when brought to a congested location such as a train, a bus, and a station, or in an educational facility where transmission of electromagnetic waves is prohibited, are automatically stopped by a communication prohibition signal and/or the communication permission signal transmitted from the control system installed at the site, thereby not influencing other people with electromagnetic waves. Even then the carrier of a portable information apparatus can still perform any processes other than transmission by means of the portable information apparatus.

In the control system for controlling portable information apparatuses having communications tools, the communication prohibition signal and/or the communication permission signal are/is weaker than electromagnetic waves transmitted from the wireless transmission/reception section of the portable information apparatus.

In this control system, the communication prohibition signal and/or the communication permission signal are/is much weaker than the electromagnetic waves transmitted from the wireless transmission/reception sections of the portable information apparatuses that they are less likely to affect other apparatuses that are easily influenced by strong ambient electromagnetic waves.

In the control system, the transmitter is operated under predetermined conditions.

For example, in operation, the transmitter is controlled under predetermined conditions specified by various sensors, a clock, and a calendar, in accordance with the day and hours and the degree of congestion of the site.

The control system may comprise a multiplicity of such transmitters as described above.

Such multiple transmitters can cover a wide area that cannot be covered by a single transmitter.

There is provided, in accordance with a still further aspect of the present invention, an apparatus equipped with a controller for controlling portable information apparatuses having communications tools, the apparatus comprising a transmitter for transmitting a communication prohibition signal and/or a communication permission signal to the portable information apparatuses, wherein the transmitter is installed on an electromagnetically susceptible apparatus that can be influenced by electromagnetic waves transmitted from the portable information apparatuses.

The apparatus transmits the communication prohibition signal and/or the communication permission signal from the transmitter, which is installed on the electromagnetically susceptible apparatus such as medical device e.g. cardiac pace-maker and airplane that can be influenced by electromagnetic waves transmitted from the portable information apparatuses. Thus, the transmission functions of portable information apparatuses approaching medical appliances or on board the airplane having such transmitters are automatically turned off not to influence others. However, the carriers of the portable information apparatuses can still perform other operations that do not involve transmission of electromagnetic waves.

The communication prohibition signal and/or the communication permission signal are/is so weak that they do not influence the electromagnetically susceptible apparatus.

Thus the apparatus equipped with the controller can prohibit ambient portable information apparatuses to transmit electromagnetic waves by transmitting the weak communication prohibition signal and/or the weak communication permission signal without affecting the apparatus itself.

DETAILED DESCRIPTION OF THE PREFERRED EMBODIMENT

The inventive portable information apparatus having communications tools, a control system for controlling the portable apparatus, and an apparatus equipped with a controller for controlling the portable information apparatus will now be described in detail by way of example with reference to the accompanying drawings.

Figure 1:
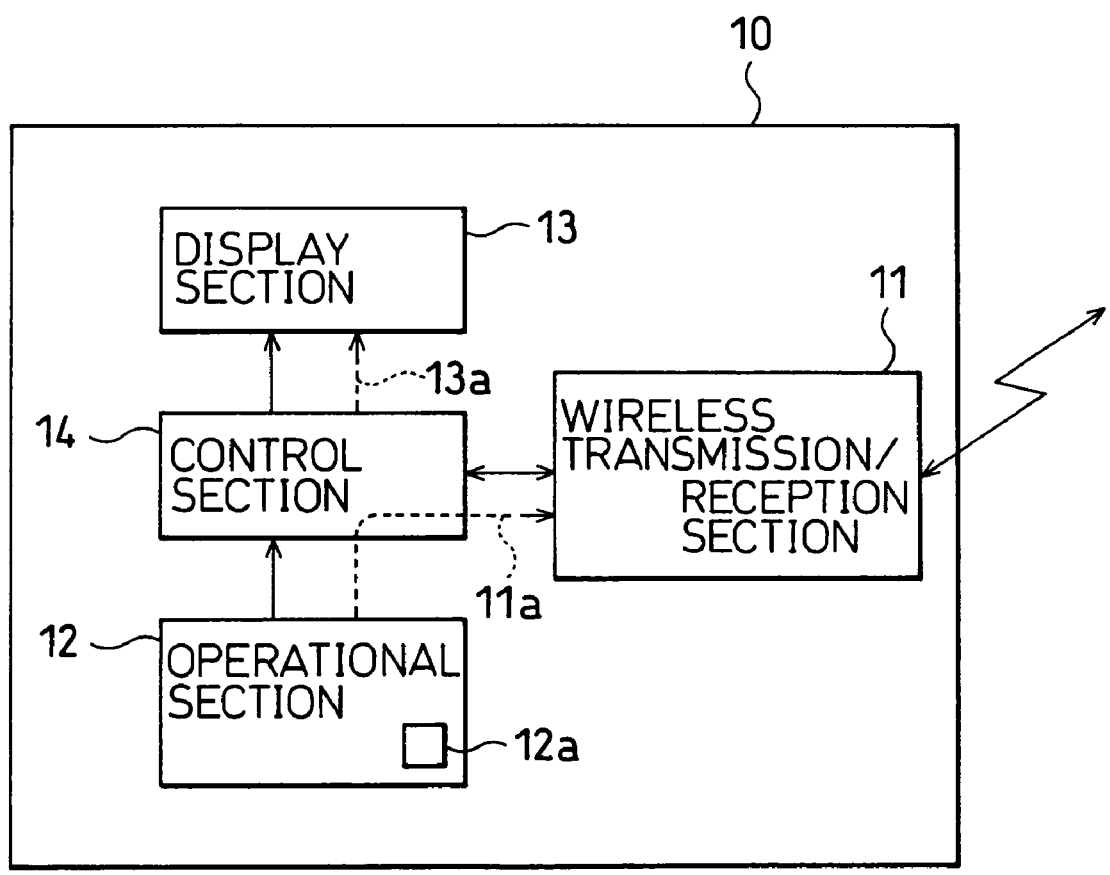
FIG. 1 is a block diagram of a first embodiment of the invention, in the form of a portable information apparatus having communications tools.

Referring now to FIG. 1, there is shown in block diagram a first embodiment of the invention in the form of a portable information apparatus having communications tools, like a cellular phone. As shown in FIG. 1, a cellular phone 10 comprises:

a wireless transmission/reception section 11 for transmitting/receiving electromagnetic signals for communication with an external transmission/reception apparatus such as a base station;

an operation section 12 for performing various operations;

a display section 13 for displaying operational status of an operation made by the operation section 12 and the status and the results of transmission/reception made by the wireless transmission/reception section 11; and a control section 14 having a CPU and a memory and connected with the wireless transmission/reception section 11, the operation section 12, and with the display section 13, for controlling overall actions of the cellular phone. The operation section 12 is provided, along with an overall power supply switch, with a transmission prohibition button 12a for selectively enabling or disenabling the transmission functions of the wireless transmission/reception section 11.

By pressing the transmission prohibition button 12a of the operation section 12, the control section 14 is activated to detect operation of the transmission prohibition button 12a and transmit a transmission prohibition signal 11a to the wireless transmission/reception section 11 to disenable the transmission section of the wireless transmission/reception section 11. At the same time, the control section 14 sends a display signal 13a indicative of the prohibition of transmission to the display section 13. In order to nullify the prohibition of transmission by the wireless transmission/ reception section 11, the transmission prohibition button 12a is pressed again or a prohibition cancel button is pressed.

Thus, according to the invention, only transmission functions of the wireless transmission/reception section 11 can be disenabled in proximity to electromagnetically susceptible apparatuses such as a cardiac pace-maker which can undergo malfunctions under strong ambient electromagnetic waves, in response to an announcement for example requesting for stopping transmission of electromagnetic waves.

However, it is possible to perform certain operations, e.g. viewing received information and preparing e-mail information, which do not require transmission of electromagnetic waves, since the cellular phone is then still turned on.

Besides, the portable information apparatus 10 having communications tools can be used as a dedicated portable information reception apparatus utilizing the receiving functions of the wireless transmission/reception section 11 when the transmission is prohibited, since only the transmission functions of the wireless transmission/reception section 11 are disenabled.

In this case, the cellular phone may be configured to automatically inform the base station, at the time when the transmission functions of the wireless transmission/reception section 11 are disenabled, of the fact that the cellular phone will be operating only as a dedicated receiver. Since this notification must be made by transmitting an electromagnetic wave, the notification is preferably done when the transmission has little influence to others, i.e. before the carrier enters public facilities for instance.

When it is needed to call up the portable information apparatus 10 that has stopped its transmission functions, the call can be made efficiently from the base station which the notification was given or from any other base station in the area including that original base station. Such call can be made in a manner similar to a call in a pocket-bell system (pager system).

In response to the call, the portable information apparatus will receive message data, store it in the memory, and/or generate vibration or display the message to inform the carrier of the reception.

In this way, it is possible to receive urgent information even when the transmission functions of the wireless transmission/reception section 11 has been stopped.

The feature of the portable information apparatus having communications tools that it can be used as a dedicated receiver can be applied to other embodiments of the invention.

Figure 2:
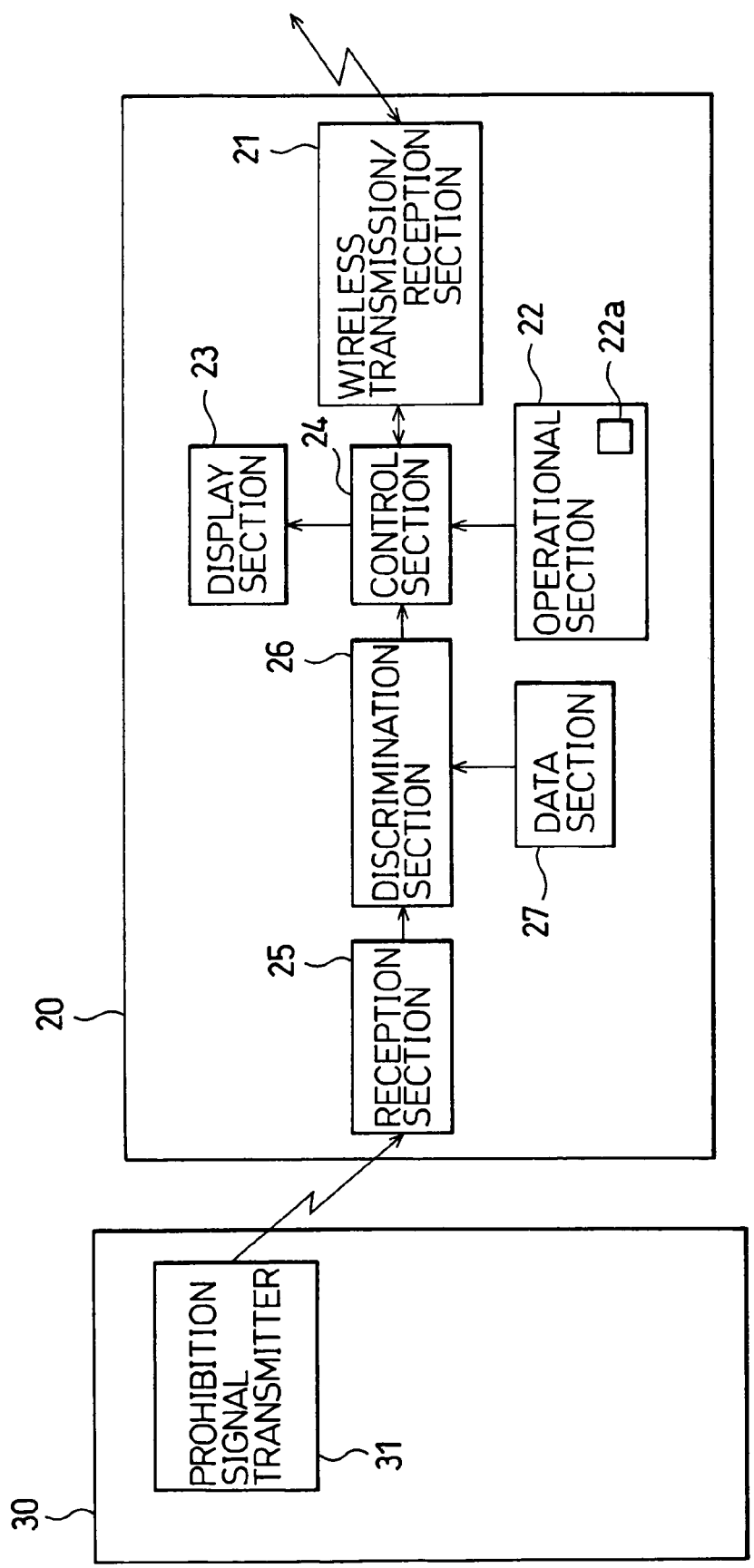
FIG. 2 is a block diagram of a second embodiment of the invention, in the form of a portable information apparatus having communications tools and a control system for controlling the apparatus having the communications tools.

Referring to FIG. 2, there is shown in block diagram a second embodiment of a portable information apparatus having communications tools, such as a cellular phone, along with a control system for controlling the apparatus.

As seen in FIG. 2, a cellular phone 20 comprises:

a wireless transmission/reception section 21 for transmitting/receiving electromagnetic signals for communication with an external wireless transmission/reception apparatus;

an operation section 22 for performing various operations;

a display section 23 for displaying status of operations made by the operation section 22, and status and the results of transmission/reception operations made by the wireless transmission/reception section 21; and a control section 24 having a CPU and a memory and connected with the wireless transmission/reception section 21, the operation section 22, and the display section 23, for controlling overall actions of the cellular phone. In addition to a power supply switch for the entire cellular phone, the operation section 22 is further provided with a transmission prohibition button 22a for selectively enabling or disenabling the transmission functions of the wireless transmission/reception section 21. The transmission prohibition button 22a functions in the same way as the transmission prohibition button 12a of FIG. 1.

The cellular phone 20 is further provided with a reception section 25 for receiving an externally generated communication prohibition signal and/or a communication permission signal which determines whether the transmission functions of the wireless transmission/reception section 21 must be enabled or disenabled. The communication prohibition signal and/or the communication permission signal transmitted to the cellular phone 20 are/is weaker than the electromagnetic wave transmitted from the cellular phone 20.

The cellular phone 20 is provided, along with the reception section 25, with a data section 27 for holding data concerning the cellular phone 20; and a discrimination section 26, adapted to receive the result of the reception by the reception section 25 and receive the data from the data section 27, for setting the transmission functions of the wireless transmission/reception section 21 enabled or disenabled, in accordance with the result of discrimination operation made by the discrimination section 26. Incidentally, the carrier of the portable information apparatus may carry out necessary operations not involving transmission of electromagnetic waves from the portable information apparatus, even when the transmission functions thereof has been disenabled.

The communication prohibition signal and/or the communication permission signal for determining enablement/ disenablement of the transmission functions of the cellular phone 20, are/is transmitted from a prohibition signal transmitter 31. The prohibition signal transmitter 31 is installed; in a public area 30 such as train, bus, railway station, and hospital where transmission of electromagnetic waves from portable information apparatus like cellular phones is prohibited.

Since the electromagnetic wave from a prohibition signal transmitter 31 is weak enough (e.g. weak FM waves) not to cause malfunctions of electromagnetically susceptible apparatuses, the wave is necessarily weaker than the waves transmitted from cellular phones 20.

As a carrier of the cellular phone 20 enters an electric train for example, the reception section 25 of the cellular phone 20 receives the communication prohibition signal and sends to the discrimination section 26 information indicative of the fact that the cellular phone 20 is receiving the signal and restrictive information contained in the signal if any.

Upon receipt of the signal from the reception section 25 and the data from the data section 27, the discrimination section 26 sends a signal to the control section 24 to determine whether the transmission functions of the wireless transmission/reception section 21 must be enabled or disenabled.

For instance, if the communication prohibition signal from the prohibition signal transmitter 31 includes prohibition of transmission for a predetermined period (e.g. from 6:30 a.m. to 20:00 p.m.) and permission of PHSs but not cellular phones, the discrimination section 26 determines enablement/disenablement of the wireless transmission/reception section 21 based on the data from the data section 27, that is, clock data and classification data classifying information apparatuses.

Incidentally, the cellular phone 20 may be adapted to resume the operation of the wireless transmission/reception section 21 when no communication prohibition signal is received or when the cellular phone receives a communication permission signal after it has received a communication prohibition signal.

Although it is shown in FIG. 2 that the reception section 25, the discrimination section 26, the data section 27 are provided separately, the reception section 25 may be substituted for the wireless transmission/reception section 21, and the discrimination section 26 and the data section 27 may be integrated in the control section 24. In that case, the prohibition signal transmitter 31 is adapted to transmit electromagnetic waves in a multiplicity of different modes so that the waves can be received by different types of cellular phones.

In the portable information apparatus having communications tools in the form of cellular phones 20, the transmission functions of the wireless transmission/reception section 21 are automatically disenabled or enabled in accordance with whether the reception section 25 has received a communication prohibition signal or a communication permission signal from an external station. Thus, the transmission functions of the portable information apparatus will be automatically turned off or on if the carrier has forgotten to do so.

Since the communication prohibition signal and/or communication permission signal are/is transmitted from a transmitter installed in a congested place such as a train, a bus, and a train station, or an educational facility where transmission of waves from cellular phones 20 should be prohibited, the communications tools of portable information apparatuses carried into such places are automatically stopped without badly affecting others.

Figure 3:
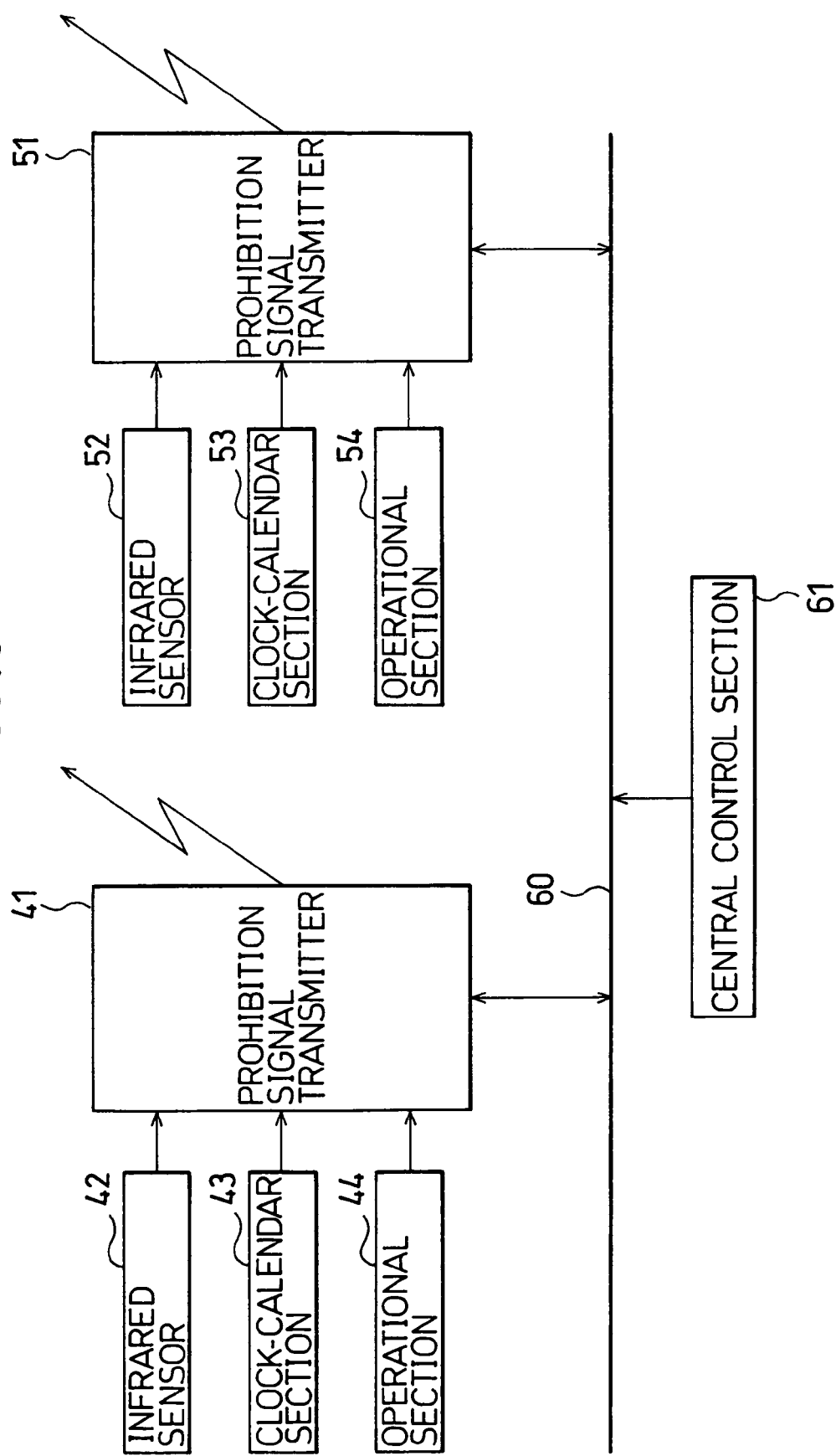
FIG. 3 shows a third embodiment of the invention, in the form of a control system for controlling a portable information apparatus having communications tools.

Referring to FIG. 3, there is shown a structure of a third embodiment of the invention, in the form of a control system for controlling portable information apparatuses having communications tools.

A prohibition signal transmitter 41 shown in FIG. 3 is installed in a public place e.g. a train station for transmitting a communication prohibition signal and/or a communication permission signal to prohibit and/or permit operation of transmission functions of cellular phones. The electromagnetic wave transmitted from the prohibition signal transmitter 41 is weak enough (e.g. weak FM waves) not to cause malfunctions of electromagnetically susceptible apparatuses, so that the waves are necessarily weaker than the waves transmitted from cellular phones.

The prohibition signal transmitter 41 may be coupled with various sensors and data means which operate under specified conditions. For example, the prohibition signal transmitter 41 may be provided with an infrared sensor 42 for sensing a human being so as to enable the prohibition signal transmitter 41 only when the site is congested, or a clock-calendar section 43 to cause the prohibition signal transmitter 41 to operate during only specified hours or on specified days, as shown in FIG. 3. The prohibition signal transmitter 41 may be also provided with an operation section 44 controlled by an administrator.

In a spacious place, additional prohibition signal transmitters 51 may be installed to cover areas which cannot be covered by individual prohibition signal transmitters. With this transmitter 51, it is possible to control enablement/disenablement of the transmission functions of the cellular phones in a spacious place. It is noted that an infrared sensor 52, a clock-calendar section 53, and an operation section 54 operate in just the same ways as the aforementioned infrared sensor 42, clock-calendar 43, and operation section 44.

In cases where a spacious place is covered with a multiplicity of prohibition signal transmitters 41 and 51, these prohibition signal transmitters 41 and 51 may be coupled with each other by a common signal line 60, and with a central control section 61. Thus, these prohibition signal transmitters may operate in collaboration with each other and may be controlled by an instruction issued from the central control section 61. Further, the system may be simplified in structure by controlling all the infrared sensors 42 and 52, clock-calendar sections 43 and 53, operation section 44 and 54 by the central control section 61.

In this case, enablement/disenablement of the transmission functions of the cellular phones may be controlled alike in a spacious place such as a train station and a park.

Figure 4:
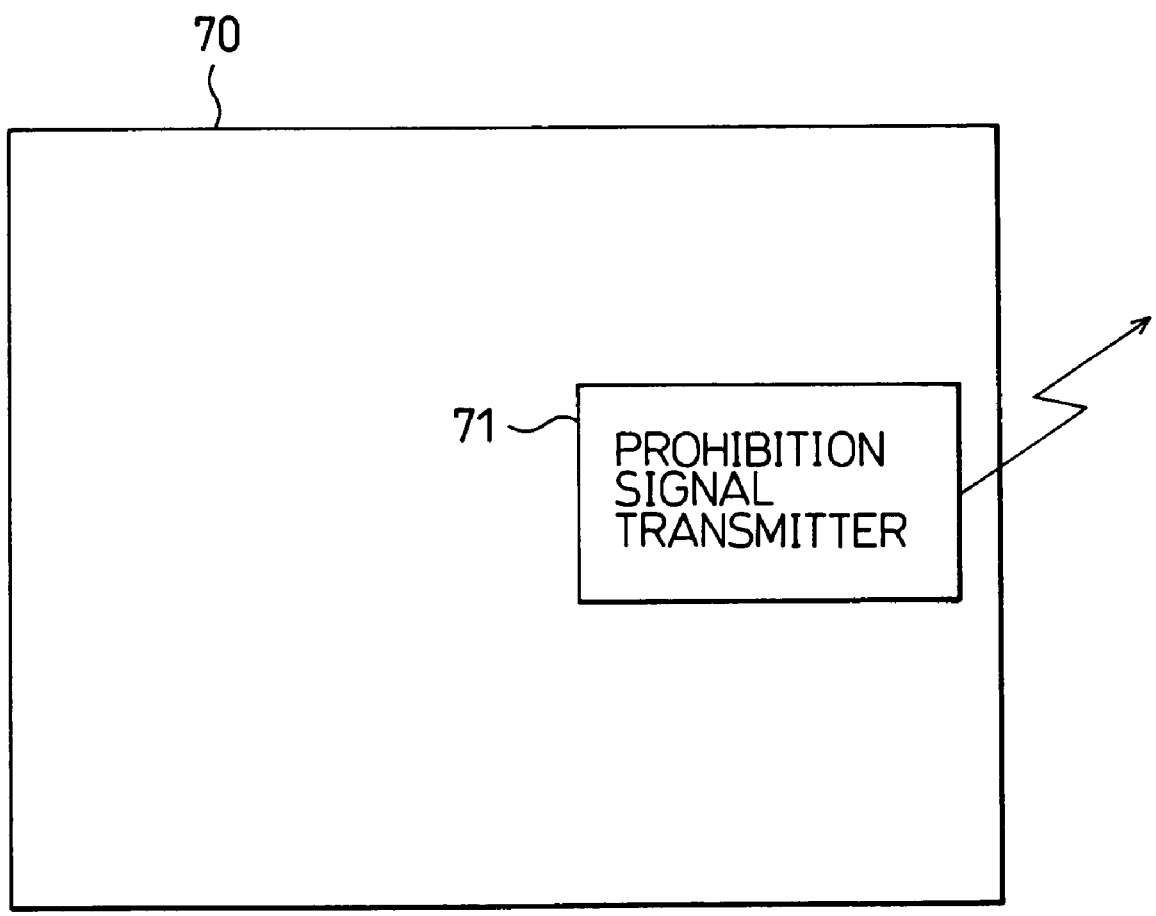
FIG. 4 shows a fourth embodiment of the invention, in the form of an apparatus equipped with a controller for controlling a portable information apparatus having communications tools.

Referring to FIG. 4, there is shown a fourth embodiment of the invention in the form of an apparatus equipped with a controller for controlling the portable information apparatuses having communications tools.

A prohibition signal transmitter 71 of FIG. 4 is installed on an apparatus 70 such as a medical apparatus (e.g. a cardiac pace-maker) and an airplane which is susceptible to electromagnetic waves from portable information apparatuses. In such instances, the communication prohibition signal and/or the communication permission signal transmitted from the prohibition signal transmitter 71 are/is weak enough not to influence the operations of the apparatus 70 itself, and are/is influential only in a limited area.

Thus, the communication prohibition signal and/or the communication permission signal are/is transmitted from the electromagnetically susceptible apparatus 70 itself, so that transmission functions of the portable information apparatuses carried by a person and approaching or getting on board the apparatus 70 are automatically disenabled. Thus, the apparatus 70 may prohibit ambient portable information apparatuses from transmitting electromagnetic waves without influencing the apparatus 70 itself.

In the examples shown in FIGS. 2 through 4, the communication prohibition signal and the communication permission signal provided from the prohibition signal transmitters 31, 41, 51, and 71 are electromagnetic waves. However, the range covered by the communication prohibition signal and/or the communication permission signal is so small compared with the distance between the base station and the cellular phones that the electromagnetic waves may be replaced by ultrasonic waves or magnetic fields.

What I claim is:

1. A portable information apparatus having communications tools, said portable information apparatus including:
   a wireless transmission/reception section for transmitting to and receiving from an external wireless transmitter/receiver electromagnetic signals;
   an operation section for performing various operations;
   a display section for displaying status of the operations made by said operation section, and status and the results of transmission/reception operations made by said wireless transmission/reception section; and
   a control section connected with said wireless transmission/reception section, operation section, and display section, for controlling overall actions of said portable information apparatus,
   said portable information apparatus further comprising reception means, within or outside said wireless transmission/reception section, for receiving a communication prohibition signal and/or a communication permission signal transmitted by the electromagnetic waves from an external facility, and for enabling/disenabling said transmission functions of said wireless transmission/reception section upon receipt of said communication prohibition signal and/or said communication permission signal,
   wherein said communication prohibition signal and/or said communication permission signal are/is weaker than the electromagnetic waves transmitted from said wireless transmission/reception section of said portable information apparatus.

2. The portable information apparatus having communications tools according to claim 1, wherein said wireless transmission/reception section is adapted to serve as a dedicated wireless receiver when said transmission functions of said wireless transmission/reception section are disenabled.

3. The portable information apparatus having communications tools according to claim 1, further comprising:
   a data section for storing data regarding the portable information apparatus;
   a discrimination section, adapted to receive the results of the reception from the reception means and receive data from the data section, for setting the transmission function of the wireless transmission/reception section enabled or disenabled, based on the results received from the reception means and the data received from the data section.

4. A control system for controlling portable information apparatuses having communications tools, said control system having a transmitter for transmitting a communication prohibition signal and/or a communication permission signal which are the electromagnetic waves to the portable information apparatuses, said transmitter installed at a location where transmissions of electromagnetic waves from said portable information apparatuses are probibited,
   Wherein said communication prohibition signal and/or communication permission signal are/is weaker than the electromagnetic waves transmitted from the wireless transmission/reception section of the portable information apparatus.

5. The control system according to claim 4, wherein said transmitter is operated under predetermined conditions.

6. A control system comprising a multiplicity of transmitters defined in claim 4.

7. An apparatus equipped with a controller for controlling portable information apparatuses having communications tools, said apparatus comprising a transmitter for transmitting a communication prohibition signal and/or a communication permission signal which are the electromagnetic waves to said portable information apparatuses, wherein said transmitter is installed on an apparatus that can be influenced by electromagnetic waves transmitted from said portable information apparatuses,
   Wherein said communication prohibition signal and/or said communication permission signal are/is weak enough not to influence said electromagnetically susceptible apparatus.

* * * * *